United States Patent
Uziel et al.

(10) Patent No.: US 12,238,767 B2
(45) Date of Patent: Feb. 25, 2025

(54) CHANNEL OCCUPANCY INFORMATION MULTI-ACCESS REPORTING

(71) Applicant: QUALCOMM Incorporated, San Diego, CA (US)

(72) Inventors: Lior Uziel, Hod Hasharon (IL); Gideon Shlomo Kutz, Ramat Hasharon (IL); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 464 days.

(21) Appl. No.: 17/513,602

(22) Filed: Oct. 28, 2021

(65) Prior Publication Data
US 2022/0141873 A1   May 5, 2022

Related U.S. Application Data

(60) Provisional application No. 63/107,868, filed on Oct. 30, 2020.

(51) Int. Cl.
| | |
|---|---|
| *H04W 74/08* | (2024.01) |
| *H04W 72/02* | (2009.01) |
| *H04W 72/04* | (2023.01) |
| *H04W 72/20* | (2023.01) |
| *H04W 74/00* | (2009.01) |
| *H04W 74/0816* | (2024.01) |

(52) U.S. Cl.
CPC ....... *H04W 74/0816* (2013.01); *H04W 72/02* (2013.01); *H04W 72/20* (2023.01); *H04W 74/002* (2013.01)

(58) Field of Classification Search
CPC ..... H04W 72/02; H04W 72/20; H04W 72/30; H04W 74/002; H04W 74/0808; H04W 74/0816
See application file for complete search history.

(56) References Cited

U.S. PATENT DOCUMENTS 11,206,517 B2 * 12/2021 Kang ............... H04W 8/005
2020/0145867 A1 * 5/2020 Tseng ............... H04L 1/0026
(Continued)

FOREIGN PATENT DOCUMENTS

WO       2020033088 A1    2/2020

OTHER PUBLICATIONS

International Search Report and Written Opinion - PCT/US2021/072127—ISA/EPO—Feb. 23, 2022.
(Continued)

*Primary Examiner* — Liton Miah
(74) *Attorney, Agent, or Firm* — ArentFox Schiff LLP

(57) ABSTRACT

User equipments (UEs) may be configured to perform channel occupancy information multi-access reporting. In some aspects, a user equipment may receive a sidelink configuration message identifying the first UE and one or more other UEs as members of a multicast group and a resource to be used for sidelink communications amongst the multicast group, and receive channel occupancy information (COI) from at least one of the one or more UEs within the multicast group, the COI indicating an occupied condition of the resource determined by the at least one of the one or more UEs during a sensing operation performed with respect to the resource. Further, the UE may select a period of time to transmit a sidelink communication based at least in part on the COI.

30 Claims, 9 Drawing Sheets

(56) References Cited

U.S. PATENT DOCUMENTS

| | | | |
|---|---|---|---|
| 2021/0219268 A1* | 7/2021 | Li | H04W 72/20 |
| 2021/0306824 A1* | 9/2021 | Li | H04W 4/40 |
| 2023/0292355 A1* | 9/2023 | Peng | H04W 72/02 |

OTHER PUBLICATIONS

Mediatek Inc: "On Sidelink Resource Allocation Mechanism", 3GPP Draft, 3GPP TSG RAN WG1 Meeting #95, R1-1812367_ON Sidelink Resource Allocation Mechanism, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12-Nov. 16, 2018, Nov. 11, 2018 (Nov. 11, 2018), XP051554276, 10 pages, Retrieved from the Internet: URL: http://www.3gpp.org/ftp/Meetings%5F3GPP%5FSYNC/RAN1/Docs/R1%2D1812367%2Ezip.

Mitsubishi Electric: "Inter-UE Coordination for Enhanced Resource Allocation", 3GPP Draft, R1-2008861, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26-Nov. 13, 2020, Oct. 23, 2020 (Oct. 23, 2020), XP051946717, 8 Pages, Retrieved from the Internet: URL:https://ftp.3gpp.org/tsg_ran/WG1_RL1/TSGR1_103-e/Docs/R1-2008861.zip R1-2008861-RAN1#102-NRSLenh_UEassistance_Mitsubishi.docx.

* cited by examiner

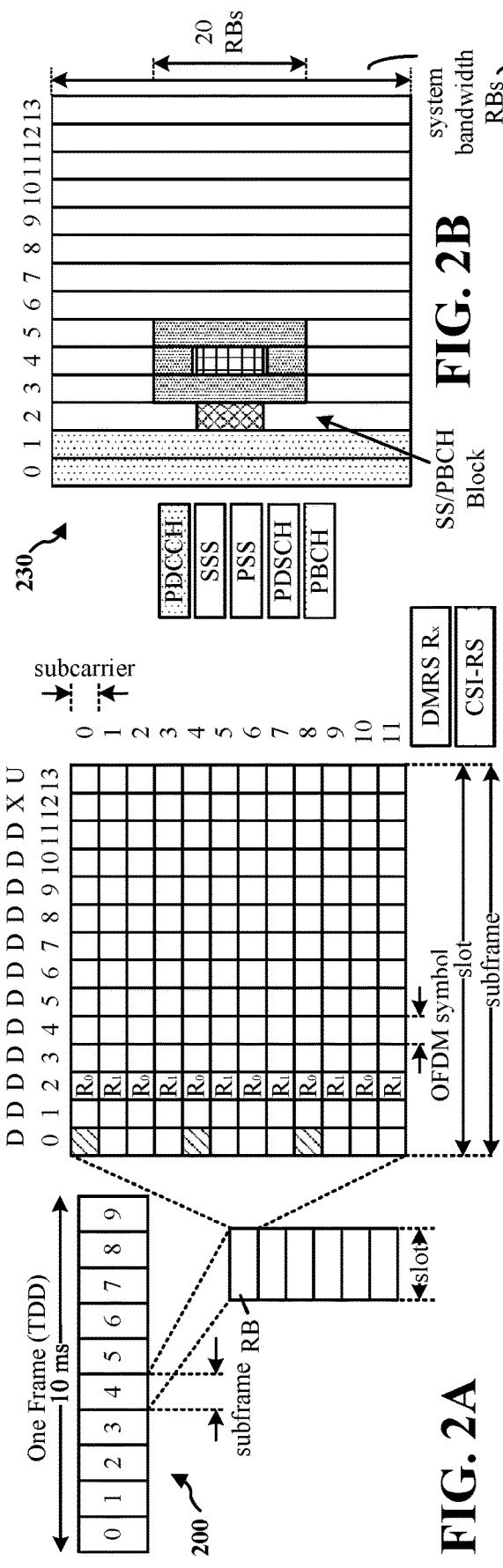
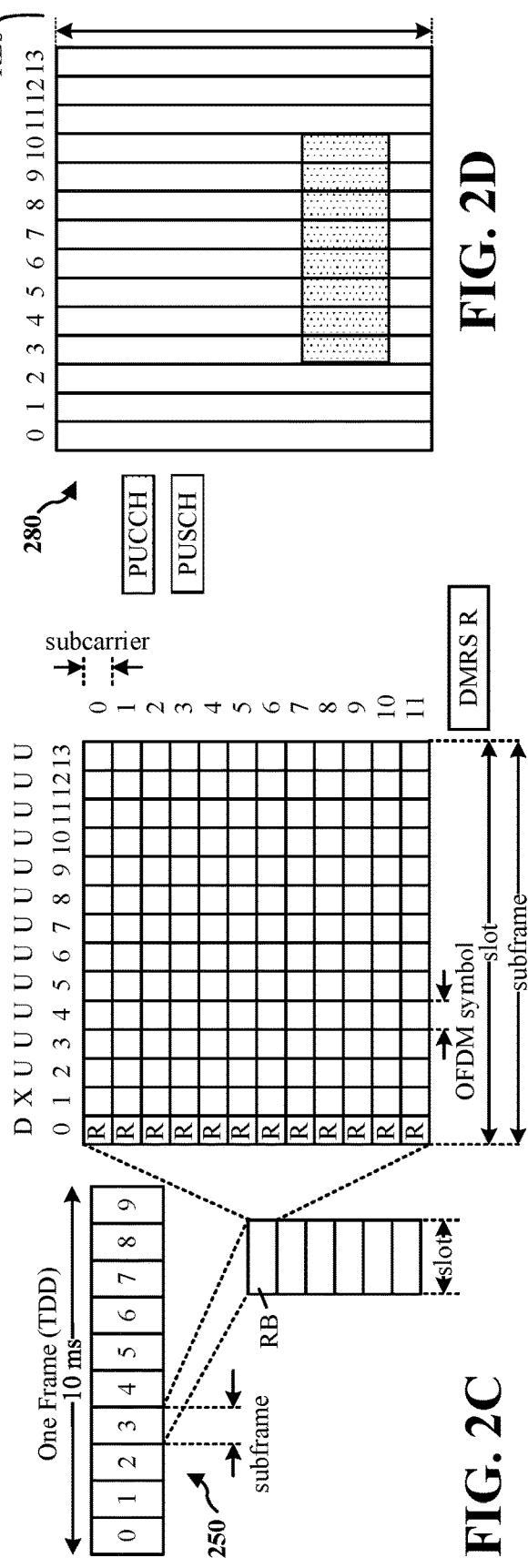
FIG. 2A  FIG. 2B  FIG. 2C  FIG. 2D

CHANNEL OCCUPANCY INFORMATION MULTI-ACCESS REPORTING

CROSS-REFERENCE TO RELATED APPLICATION

This application claims priority to U.S. Application No. 63/107,868, entitled "CHANNEL OCCUPANCY INFORMATION MULTI-ACCESS REPORTING," filed on Oct. 30, 2020, the disclosure of which is incorporated by reference herein in its entirety.

BACKGROUND

Technical Field

The present disclosure relates generally to wireless communication, and more particularly, to sidelink enhancement using occupancy information multi-access reporting to coordinate amongst user equipments (UEs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

Some wireless communication networks include device-to-device (D2D) communication such as, but not limited to, vehicle-based communication devices that may communicate from vehicle-to-vehicle (V2V), vehicle-to-infrastructure (V2I) (e.g., from the vehicle-based communication device to road infrastructure nodes), vehicle-to-network (V2N) (e.g., from the vehicle-based communication device to one or more network nodes, such as a base station), a combination thereof and/or with other devices, which can be collectively referred to as vehicle-to-anything (V2X) communications. Further improvements in multiple-access and D2D technologies are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A first example implementation includes a method of wireless communication at a first user equipment (UE) comprising receiving a sidelink configuration message identifying the first UE and one or more other UEs as members of a multicast group and a resource to be used for sidelink communications amongst the multicast group, receiving channel occupancy information (COI) from at least one of the one or more UEs within the multicast group, the COI indicating an occupied condition of the resource determined by the at least one of the one or more UEs during a sensing operation performed with respect to the resource, and selecting a period of time to transmit a sidelink communication based at least in part on the COI.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

A second example implementation includes a method of wireless communication at a first UE comprising receiving a sidelink configuration message identifying the first UE and one or more other UEs as members of a multicast group and a resource to be used for sidelink communications amongst the multicast group, performing a sensing operation on the resource based on the sidelink configuration message, determining an occupied condition of the resource based on the sensing operation, and sending, to a second UE, COI indicating the occupied condition of the resource, the second UE configured to select a period of time to transmit a sidelink communication based at least in part on the COI.

The disclosure also provides an apparatus (e.g., UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
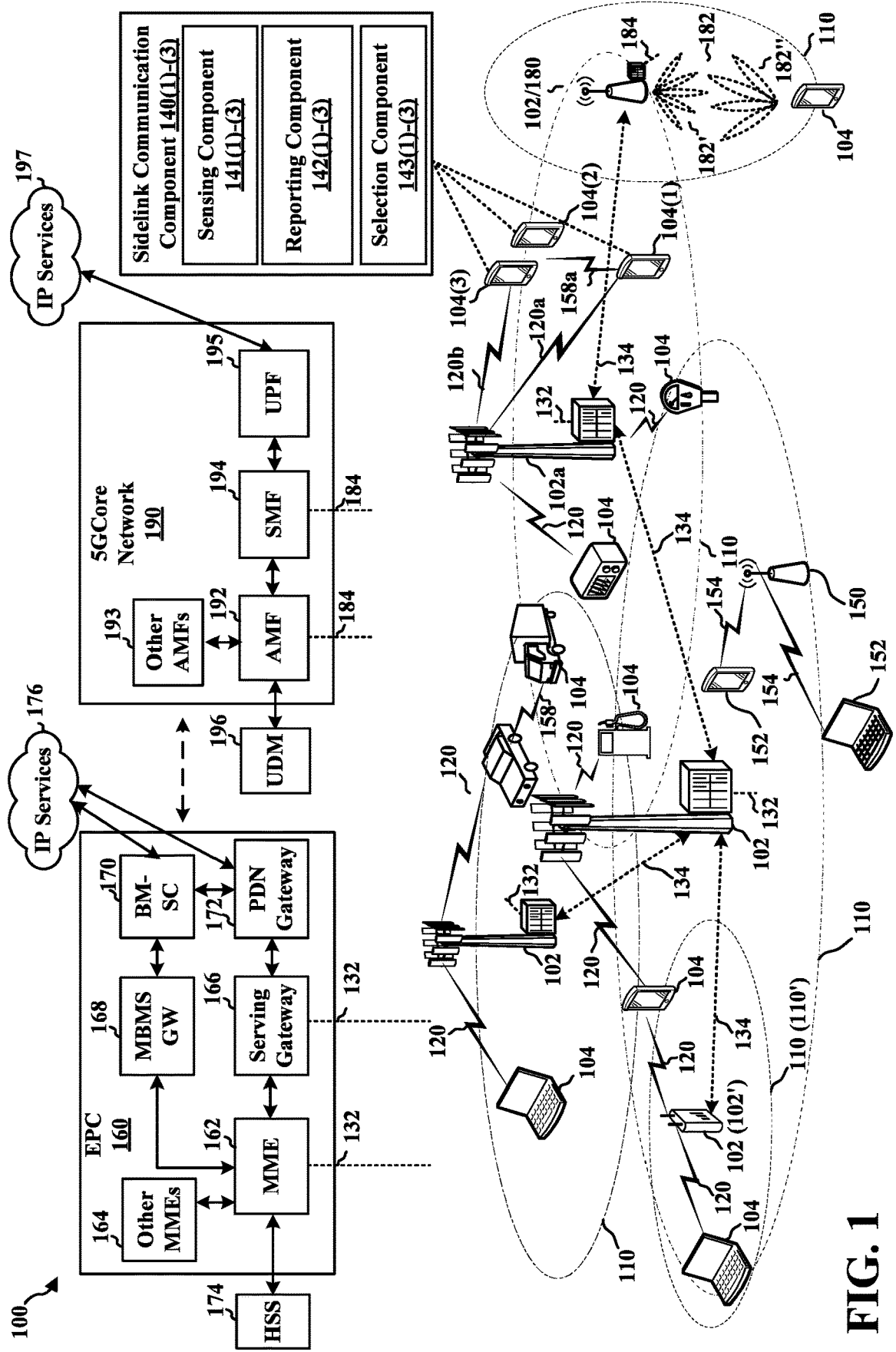
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present aspects generally relate to sidelink communications, which include a first UE communicating over a sidelink to one or more other UEs. The sidelink may include a physical sidelink shared channel (PSSCH), a physical sidelink control channel (PSCCH), and a physical sidelink feedback channel (PSFCH). NR sidelink transmissions may include broadcast transmissions, unicast transmissions, and groupcast transmission. In unicast transmissions, the transmitting UE has a single receiver UE as a recipient. Groupcast transmissions are employed when the transmitting UE endeavors to communicate with more than one UE, but only a specific sub-set of the UEs in the vicinity of the transmitting UE. Broadcast transmissions enable a UE to communicate with all UEs within a transmission range of the transmitting UE. The PSSCH may be transmitted by a sidelink transmitting UE, which conveys sidelink transmission data, system information blocks (SIBs) for radio resource control (RRC) configuration, and a part of sidelink control information (SCI). The PSCCH may carry the SCI, which may include information about the resource allocation of the PSSCH. The PSFCH may be transmitted by a sidelink receiving UE for unicast and groupcast transmissions.

Specifically, the present disclosure relates to enhancements to the sidelink communications, and in particular, a procedure for employing COI multi-access reporting for improved sidelink communications. For example, a plurality of UEs may be organized into a group for groupcast transmissions. Further, a transmitting UE may receive COI reports from one or more other UEs within the group. As described in detailed herein, each COI report may be generated by an individual UE of the group based on sensing operations performed by the individual UE and indicate an occupied condition of a resource associated with the group. Additionally, in some instances, the transmitting UE may perform resource selection based on the COI reports.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In some aspects, an individual UE 104 may include a sidelink communication component 140 for managing sidelink communications with other UEs 104. As illustrated in FIG. 1, the sidelink communication component 140 may include a sensing component 141 configured to perform sensing operations to determine a sensed power, a reporting component 142 to generate COI based on the sensed power, and a selection component 143 configured to select a time-frequency location based on the COI. In some aspects, the sidelink communication component 140(1) may manage groupcast communications over a sidelink 158*a* with other UEs 104(2)-(2) of a group. As described herein, the sidelink communication component 140(1) may receive COI from the other UEs 104(2)-(3), and perform resource selection based on the COI when endeavoring to transmit a groupcast transmission to the other UEs 104. In addition, the sidelink communication component 140(1) may perform a sensing operation, generate COI based on the sensing operation, and send the COI to the other UEs 104(2)-(3) to enable the other UEs 104(2)-(3) to transmit a groupcast transmission to the group.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102*a* may have a coverage area 110*a* that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102*a* may operate in a licensed or an unlicensed frequency spectrum. When operating in an unlicensed frequency spectrum, the small cell 102*a* may employ NR and use the same 5 GHz unlicensed frequency spectrum as used by the Wi-Fi AP 150. The small cell 102*a*, employing NR in an unlicensed frequency spectrum, may boost coverage to or increase capacity of the access network.

A base station 102, whether a small cell 102*a* or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology μ, there are 14 symbols/slot and 2μ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
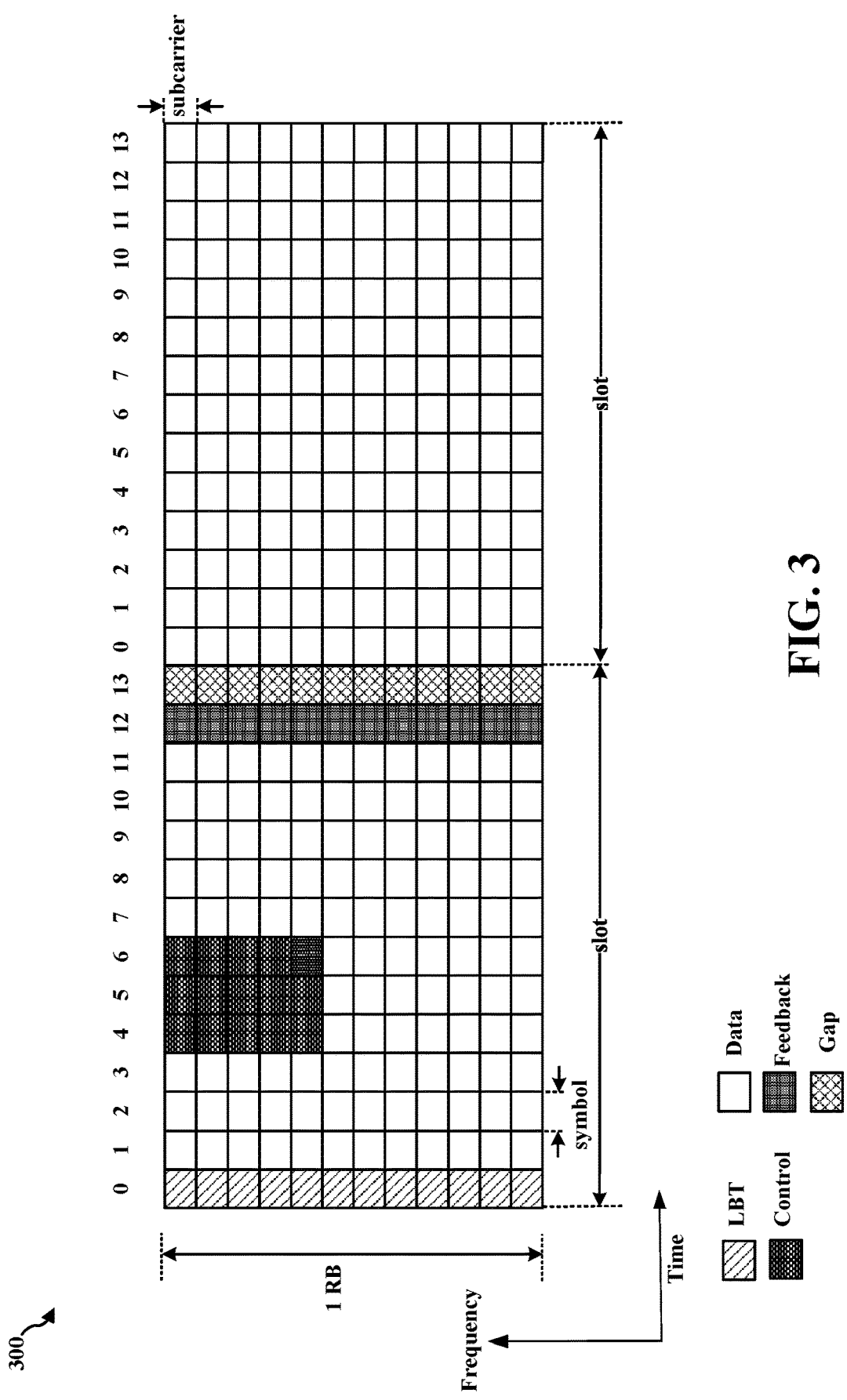
FIG. 3 is a diagram of an example frame structure and resources for sidelink communications between two of the communicating nodes in the system of FIG. 1 in accordance with one or more aspects of the present disclosure.

FIG. 3 is a diagram 300 of an example of a slot structure that may be used within a 5G/NR frame structure, e.g., for sidelink communication. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Some of the REs may comprise control information, e.g., along with demodulation RS (DM-RS). The control information may comprise Sidelink Control Information (SCI). In some implementations, at least one symbol at the beginning of a slot may be used by a transmitting device to perform a Listen Before Talk (LBT) operation prior to transmitting. In some implementations, at least one symbol may be used for feedback, as described herein. In some implementations, another symbol, e.g., at the end of the slot, may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3.

Figure 4:
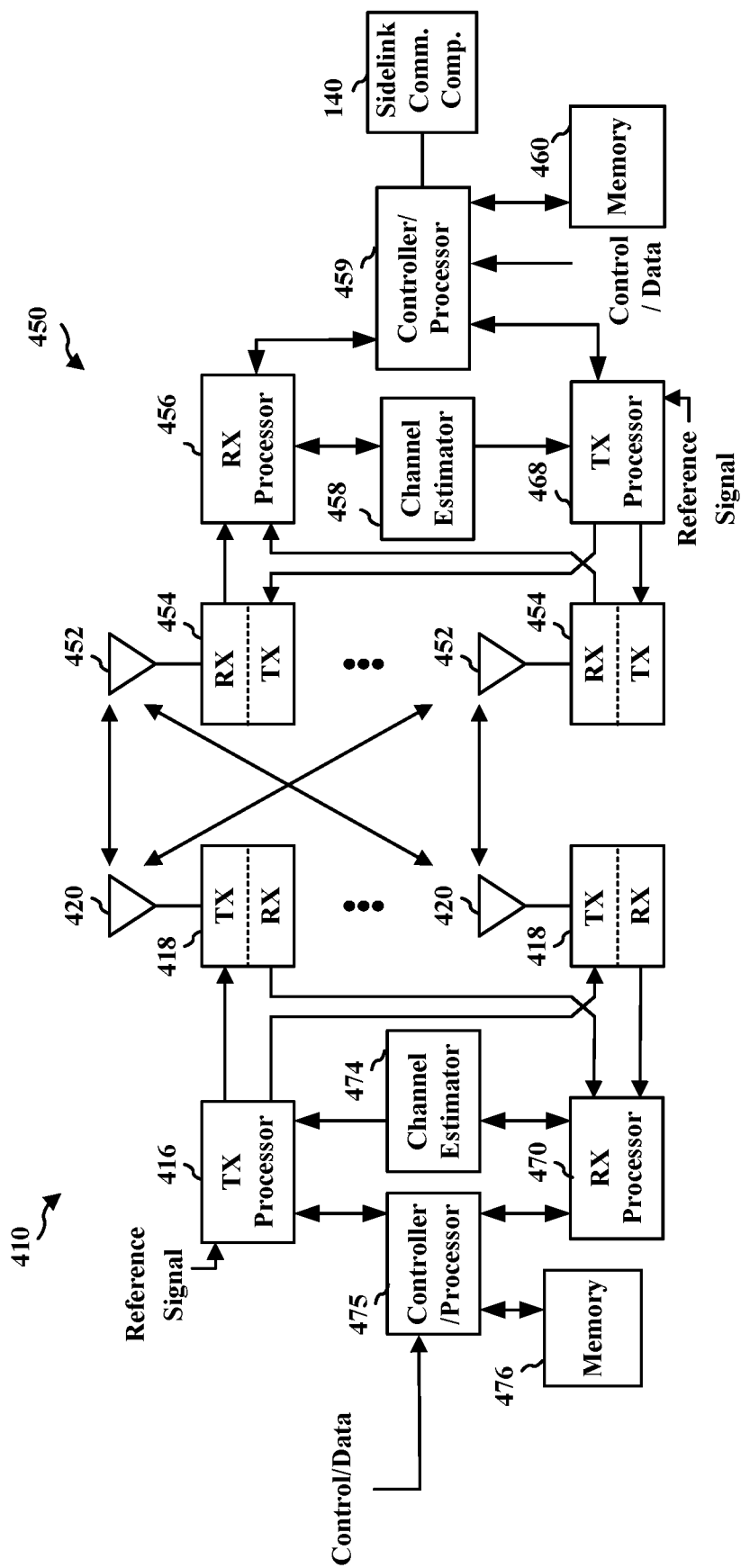
FIG. 4 is a diagram illustrating an example of a base station and a user equipment (UE) in an access network, in accordance with some aspects of the present disclosure.

FIG. 4 is a block diagram of a base station 102/180 in communication with a UE 104 in an access network. In the DL, IP packets from the EPC 160 may be provided to a controller/processor 475. The controller/processor 475 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal or channel condition feedback transmitted by the UE 104. Each spatial stream may then be provided to a different antenna 420 via a separate transmitter 418TX. Each transmitter 418TX may modulate an RF (radio frequency) carrier with a respective spatial stream for transmission.

At the UE 104, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 104. If multiple spatial streams are destined for the UE 104, they may be combined by the RX processor 456 into a single OFDM symbol stream. The RX processor 456 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 458. The soft decisions are then decoded and deinterleaved to recover the data and control signals that were originally transmitted by the base station 102/180 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK or NACK protocol to support HARQ operations.

Similar to the functionality described in connection with the DL transmission by the base station 102/180, the controller/processor 459 provides RRC layer functionality associated with system information (for example, MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 102/180 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 102/180 in a manner similar to that described in connection with the receiver function at the UE 104. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 104. IP packets from the controller/processor 475 may be provided to the EPC 160. The controller/processor 475 is also responsible for error detection using an ACK or NACK protocol to support HARQ operations.

In the UE 104, at least one of the TX processor 468, the RX processor 456, and the controller/processor 459 may be configured to perform aspects in connection with the sidelink communication component 140 of FIG. 1.

In some instances, a plurality of UEs may receive configuration information organizing the plurality of UEs into a multicast group. Further, the configuration information may associate the multicast group with a resource. In some aspects, the resource may be one or more sub-channels in the frequency domain and one or more slots or subframes in the time domain. In some aspects, the minimum unit for resource scheduling in the frequency domain is a sub-channel, which is composed of 10, 15, 20, 25, 50, 75, or 100 consecutive RBs.

Further, the plurality of UEs may send each other COI indicating the occupied condition of the resource as determined by a sensing procedure performed at the transmitting UE. In some aspects, the plurality of UEs may send the COI in response to determining that the resource is occupied, and the COI may indicate that a frequency resource associated with the resource is occupied during one or more time resources associated with the resource. Additionally, a UE within the multicast group performing resource selection for a sidelink transmission may identify candidates from the resource for the sidelink transmission based at least in part on the COI. In addition, the UE may select one of the candidates and perform the sidelink transmission via the selected candidate. For instance, a UE may determine that a sub-channel is not occupied at a period of time corresponding to a particular slot given that none of the COI received indicates that the sub-channel is occupied during the particular slot. In response, the UE may project that the sub-channel will not be busy during a future occurrence of the slot, and employ the sub-channel at a future occurrence of the slot to perform the sidelink transmission.

In some aspects, the COI is generated and disseminated amongst the members of a multicast group to avoid interference and/or collision between sidelink communications in the vicinity of the UEs of the multicast group by identifying occupied and/or unoccupied resources to the UEs of the multicast group. Further, the present techniques minimize or reduce congestion by reducing the number of messages used to identify occupied and/or unoccupied resources to the UEs of the multicast. In particular, in some aspects, a UE within the multicast group may only transmit COI when the UE identifies that the resource associated with the multicast group is occupied, as opposed to sending messages corresponding to individual neighbors of the UE and/or messages indicating the resource is unoccupied. Further, in some aspects, the UE may send COI including a compressed and/or encoded representation of the occupied condition of a resource for a predefined window instead of including the amount of sensed values, thereby reducing the size of each individual message employed to identify occupied and unoccupied resources to the UEs of the multicast group. In some instances, the reduced size of the COI may improve performance by reducing transmission time of the COI. Accordingly, the present techniques enable a group of UEs to perform groupcast sidelink communications, while minimizing collision of groupcast communications, implementing congestion avoidance, and improving system performance.

Referring to FIGS. 5-9, in one non-limiting aspect, a system 500 is configured to minimize or reduce message congestion caused by a coordinated resource selection technique for members of a multicast group.

Figure 5:
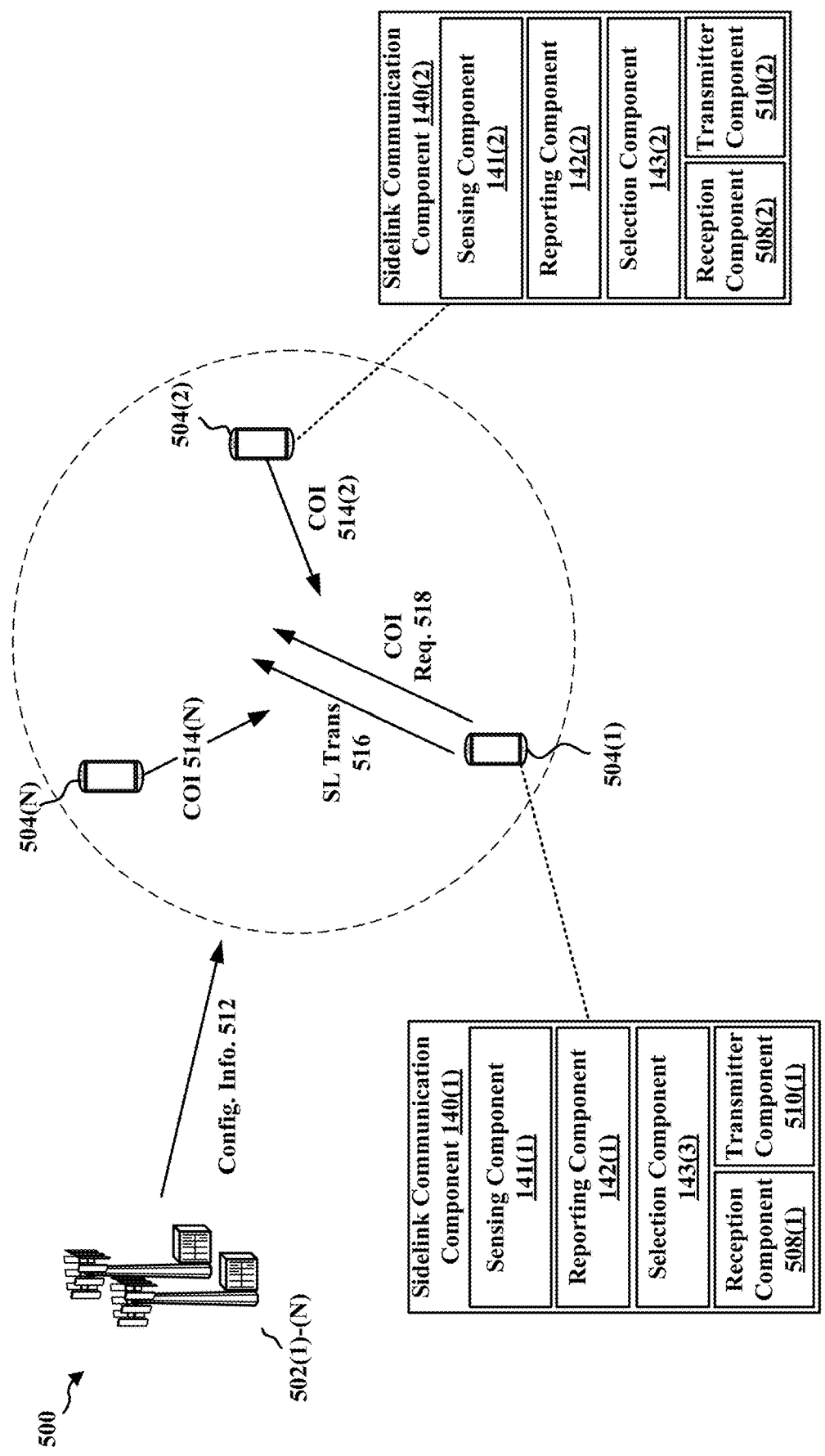
FIG. 5 is a diagram illustrating example communications and components of base stations and UEs, in accordance with some aspects of the present disclosure.

FIG. 5 is a diagram illustrating example communications and components of base stations and UEs. As illustrated in FIG. 5, the system 500 may include a plurality of base stations 502(1)-(N) and plurality of UEs 504(1)-(N). In some aspects, the plurality of UEs 504(1)-(N) may be located within a similar location, and operating on the same network as the plurality of base stations 502(1)-(N). Additionally, in some aspects, the plurality of base stations 502(1)-(N) may be examples of a base station 102, and the plurality of UEs 504(1)-(N) may be examples of a UE 104. As described in detail herein, the UEs 504(1)-(N) may be organized to a multicast group 506 for groupcast communications.

As illustrated in FIG. 5, a UE 504 may include the sidelink communication component 140 configured to manage sidelink communications by the UE 504. As described with respect to FIG. 1, the sidelink communication component 140 may include a sensing component 141, a reporting component 142, and a selection component 143. In addition, a UE 504 may include a reception component 508 and a transmitter component 510. The transmitter component 510 may be configured to generate signals for transmission operations and sensing as described herein. The transmitter component 510 may include, for example, a RF transmitter for transmitting the signals described herein. The reception component 508 may include, for example, a RF receiver for receiving the signals described herein. In an aspect, the reception component 508 and the transmitter component 510 may be co-located in a transceiver (e.g., the transceiver 710).

In some aspects, the plurality of UEs 504(1)-(N) may receive configuration information 512 identifying a multicast group 506 and a resource to be used for sidelink communications in the multicast group 506. The configuration information 512 may be sidelink control information (SCI) (e.g., a SCI 2 message) including a group identifier identifying the multicast group 506 and a resource identifier identifying the resource. In some examples, a network may employ dedicated RRC signaling to communicate the configuration information 512 via a base station 502. In some other examples, a UE 504 within the multicast group 506 may transmit the configuration information 512 to members of the multicast group 506.

Additionally, in some aspects, the configuration information 512 may further include scheduling information indicating a periodicity for the transmission of COI 514(1)-(N) by the UEs 504(1)-(N) of the multicast group 506. As described herein, the COI 514(1)-(N) may indicate an occupied condition of the resource associated with the multicast group 506. For example, the COI 514(1) may indicate whether a sub-channel is occupied or unoccupied. In some instances, a COI 514 message may report an occupied condition for at least 10 sub-channels having ten transmission time intervals (e.g., subframes/slots). Further, in some aspects, a member of the multicast group 506 may only send the COI 514 when the member of multicast group 506 has determined that the resource is occupied based on a threshold value. In other words, in some aspects, a member of the multicast group 506 will refrain from transmitting COI 514 when the member has determined that the sub-channel is unoccupied over the window based on a threshold value (e.g., a predefined threshold). As such, the present techniques described herein implement congestion avoidance by minimizing and/or reducing the amount of COI 514(1)-(N) transmitted amongst the multicast group 506. In some instances, the configuration information 512 may indicate one or more threshold values the members of the multicast group 506 may use to determine the occupied condition of the resource.

Further, the configuration information 512 may include one or more recommended formats for the COI 514(1)-(N). For example, the configuration information 512 may indicate whether the COI 514(1)-(N) should be based on a received signal strength indicator (RSSI), a reference signal received power (RSRP), and/or channel busy ratio (CBR). As used herein, the CBR may refer to the portion of sub-channels having RSSI exceeding a preconfigured value over a certain time duration. For example, the configuration information 512 may indicate whether the COI 514(1)-(N) should be based on a RSSI, RSRP, and/or CBR. As another example, the configuration information 512 may indicate that the COI 514(1)-(N) should indicate the metric and/or threshold value used to determine the occupied condition.

After the UEs 504(1)-(N) are organized into the multicast group 506, the UEs 504(1)-(N) may transmit groupcast sidelink transmissions 516(1)-(N) amongst each other. To avoid causing interference between the sidelink transmissions 516(1)-(N), a transmitting UE 504(1) may identify candidate resources potentially available to be utilized for sidelink communications. As described in detail herein, the candidate resources include the resources identified as unoccupied based on the COI 514(1)-(N).

For example, as illustrated in FIG. 5, the UE 504(1) may send a COI request 518 to the other UEs 504(2)-(N) when the UE 504(1) endeavors to groupcast a sidelink transmission 516 to the multicast group 506, and receive COI 514(1)-(N) from the members of the multicast group 506 that have identified instances where the resource appears occupied. In some instances, the COI request 518 may be transmitted using the PSCCH with a SCI type 2 message to trigger the groupcast reporting. In some other aspects, the UEs 504(1)-(N) may periodically transmit the COI 514(1)-(N) based on a periodicity defined in the configuration information 512. Further, the UE 504(1) may determine resource parameters (i.e., a time resource and a frequency resource) for transmitting a sidelink transmission 516(1) to the multicast group based on the occupied condition of the resource as reflected in the COI 514. As described herein, the plurality of UEs 504(1)-(N) may transmit the COI 514(1)-(N) to each other in accordance with the disclosed reporting procedure to implement interference avoidance while preventing or limiting the plurality of UEs 504(1)-(N) from causing a congestion issue and/or requiring the plurality of UEs 504(1)-(N) to transmit unnecessarily large messages specifying the network activity of each UE 504 within the multicast group 506. Further, the UEs 504(1)-(N) may communicate the COI 514(1)-(N) via a physical layer (PHY) protocol over a PHY channel. As such, the UEs 504(1)-(N) may not require processing by a higher level layer during the reporting of the COI 516(1)-(N).

Figure 6:
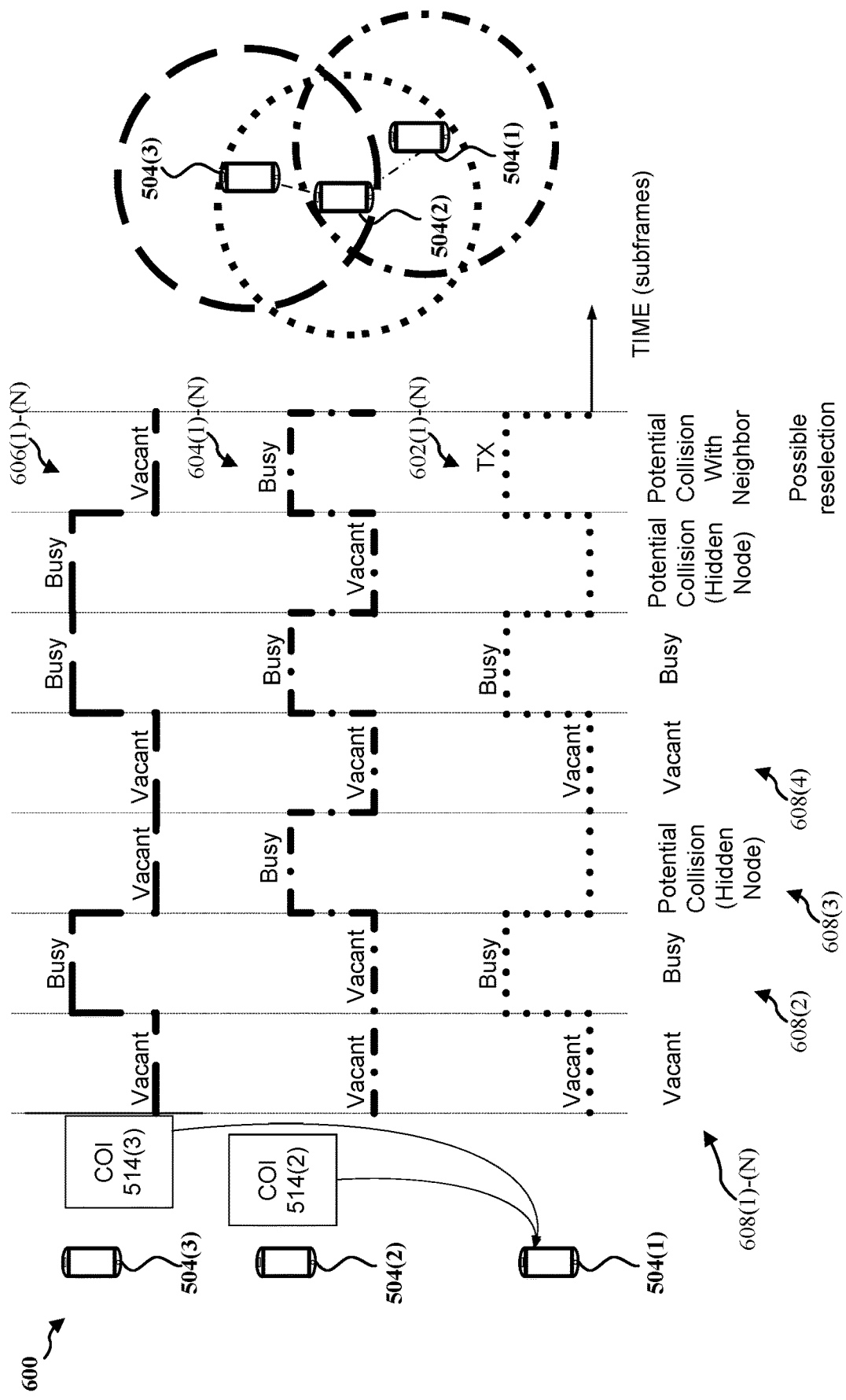
FIG. 6 is a diagram illustrating an example of generating channel occupancy information, in accordance with some aspects of the present disclosure.

FIG. 6 is a diagram illustrating an example of generating channel occupancy information, in accordance with some aspects of the present disclosure.

As illustrated in FIG. 6, the UEs 504(1)-(3) may perform sensing operations to sense power on a resource (e.g., one or more time and frequency locations). In response to the sensing operations the UEs 504(1)-(3) may determine a plurality of occupied conditions of the resource indicating whether the resource is vacant (i.e., unoccupied, vacancy condition), busy (i.e., occupied, occupied condition), or the sensing UE is performing a transmission. For instance, the UE 504(1) may determine the plurality of occupied conditions 602(1)-(N), the UE 504(2) may determine the plurality of occupied conditions 604(1)-(N), and the UE 504(3) may determine the plurality of occupied conditions 606(1)-(N). As described in detail herein, in some aspects, the sensing UE may determine that the resource is occupied when the RSSI or RSRP is above a threshold value. In some other aspects, the sensing UE may determine that the resource when the CBR is above a threshold value. Further, the UEs 504(2) may send the plurality of occupied conditions 604(1)-(N) to the UE 504(1) as the COI 514(2), and the UE 504(3) may send the plurality of occupied conditions 606(1)-(N) to the UE 504(1) as the COI 514(3). In addition, the UE 504(1) may be able to determine projections 608(1)-(N) of the availability of the resource based on the plurality of occupied conditions 602(1)-(N), the COI 514(2), and/or the COI 514(3). For example, as illustrated in FIG. 6, the UE 504(1) may determine a projection 610(2) indicating that the resource is occupied at a second subframe based on the COI 514(3) indicating that the resource was busy during the subframe. As another example, as illustrated in FIG. 6, the UE 504 may determine a projection 608(4) indicating that the resource is unoccupied (e.g., vacant) at a fourth subframe based on the COI 514(2) and COI 514(3) both indicating that the resource was vacant or unoccupied or not busy during the subframe. In some instances, the COI 514(2)-(3) may not include any reporting information pertaining to the fourth slot based on both the UEs 504(2)-(3) determining that the resource was unoccupied during the fourth subframe. Consequently, the UE 504(1) may determine that the resource is unoccupied based on the absence of a COI 514 identifying the resource as busy during the fourth subframe. Further, as illustrated in FIG. 6, the UE 504(1) may determine a potential collision, such as at projection 608(3), due to a hidden node or transmission by the UE 504(1). For example, if the plurality of occupied conditions 602(1)-(N) indicates that the third subframe is unoccupied and the COI 514(2) indicates that the third subframe is unoccupied but the COI 514(3) indicates that the third subframe is occupied, the UE 504(1) may determine that there exists a node (e.g., another UE) hidden from at least the UE 504(1). As another example, if the UE 504(1) is performing a transmission at the Nth subframe, the UE 504(1) may determine a projection 610(N) indicating that the resource is busy. Further, in some aspects, a UE 504 may transmit COI 514 with an impairment indicator corresponding to a time-frequency location when the UE 504 is performing a transmission at the time-frequency location during a sensing procedure.

Figure 7:
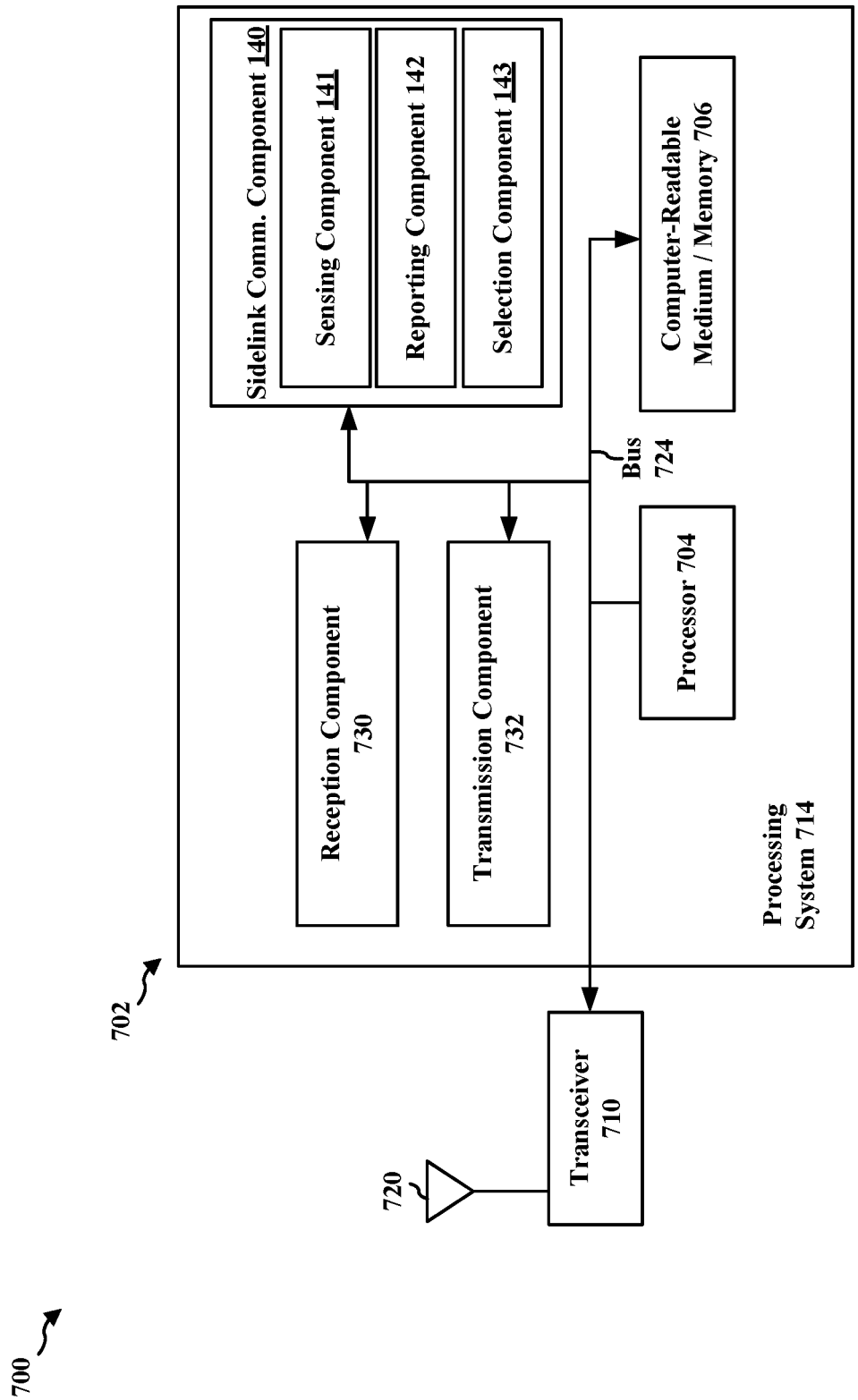
FIG. 7 is a diagram illustrating an example of a hardware implementation for a UE employing a processing system, in accordance with some aspects of the present disclosure.

FIG. 7 is a diagram 700 illustrating an example of a hardware implementation for a UE 702 (e.g., the UE 102, the UEs 504(1)-(N), etc.) employing a processing system 714. The processing system 714 may be implemented with a bus architecture, represented generally by the bus 724. The bus 724 may include any number of interconnecting buses and/or bridges depending on the specific application of the processing system 714 and the overall design constraints. The bus 724 links together various circuits including one or more processors and/or hardware components, represented by the processor 704, the sidelink communication component 140, and the computer-readable medium (e.g., non-transitory computer-readable medium)/memory 706. The bus 724 may also link various other circuits such as timing sources, peripherals, voltage regulators, and power management circuits, which are well known in the art, and therefore, will not be described any further.

The processing system 714 may be coupled with a transceiver 710. The transceiver 710 may be coupled with one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 730. In addition, the transceiver 710 receives information from the processing system 714, specifically the transmitter component 732, and based on the received information, generates a signal to be applied to the one or more antennas 720. The processing system 714 includes a processor 704 coupled with a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 may further includes the sidelink communication component 140. The component may be a software component running in the processor 704, resident/stored in the computer readable medium/memory 706, one or more hardware components coupled with the processor 704, or some combination thereof. The processing system 714 may be a component of the UE 450 and may include the memory 460 and/or at least one of the TX processor 468, the RX processor 456, and the controller/processor 459. Alternatively, the processing system 714 may be the entire UE (e.g., see 450 of FIG. 4).

The sidelink communication component 140 may be configured to manage sidelink communications amongst a multicast group (e.g., the multicast group 506). In some aspects, the sidelink communication component 140 includes a sensing component 141 configured to perform channel sensing activities using the transmission component 412 and the reception component 410 over the resource to determine sensed information.

Further, in some aspects, the sidelink communication component 140 may include a reporting component 142 configured to generate and transmit COI 514 to the members of the multicast group 506. In some aspects, the reporting component 142 may compare the sensed information to a threshold value. If the sensed information includes subframes or slots where the power sensed during the sensing operation is greater than the threshold value, the reporting component 142 may determine that the resource is occupied with respect to the subframe or slot corresponding to the resource. As an example, the resource may include a sub-channel as the time resource and the sensed information may be a RSSI measurement of slots or subframes of the sub-channel. Further, the reporting component 142 may determine a subframe of the sub-channel to be occupied when the RSSI measurement corresponding to the subframe is greater than the threshold. Additionally, if the UE 702 is performing a transmission operation during a subframe, the reporting component 142 assumes that the RSSI measurement is greater than the threshold. As another example, the resource may be a sub-channel and the sensed information may be a RSRP measurement of slots or subframes of the sub-channel. Further, the reporting component 142 may identify a subframe of the channel to be occupied when the RSRP measurement corresponding to the subframe is greater than the threshold. As yet still another example, the resource may be a plurality of sub-channels and the sensed information may be a plurality of CBR values for the plurality of sub-channels, wherein each CBR value corresponds the amount of sub-channels of the plurality of sub-channels whose RSSI exceeds a first threshold value at a particular period of time. Further, the reporting component 142 may identify the plurality of sub-channels as occupied during the particular period of time when the CBR value is greater than a threshold value.

In some other aspects, the reporting component 142 may transmit the sensed information within the COI 514. Further, the receiving UE may compare the sensed information to a threshold value to determine if the resource is considered occupied at the UE 702. In addition, if the receiving UE is unable to identify a sufficient number of candidates for resource selection, the receiving UE may lower the threshold applied to the sensed information.

The selection component 143 may identify the candidates for resource selection based on the COI 514, and select a time-frequency location associated with the resource from the identified candidates for transmitting a sidelink transmission 516. For example, the selection component 143 may receive COI 514(2)-(3) from the UEs 502(2)-(3). In addition, the selection component 143 may project that the fourth subframe of the resource may be unoccupied based on the COI 514(2)-(3). Further, the UE 702 may transmit the sidelink transmission 516 via the fourth subframe based on the projection.

The aforementioned means may be one or more of the aforementioned components of the UE 702 and/or the processing system 714 of UE 702 configured to perform the functions recited by the aforementioned means. As described supra, the processing system 714 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

Figure 8:
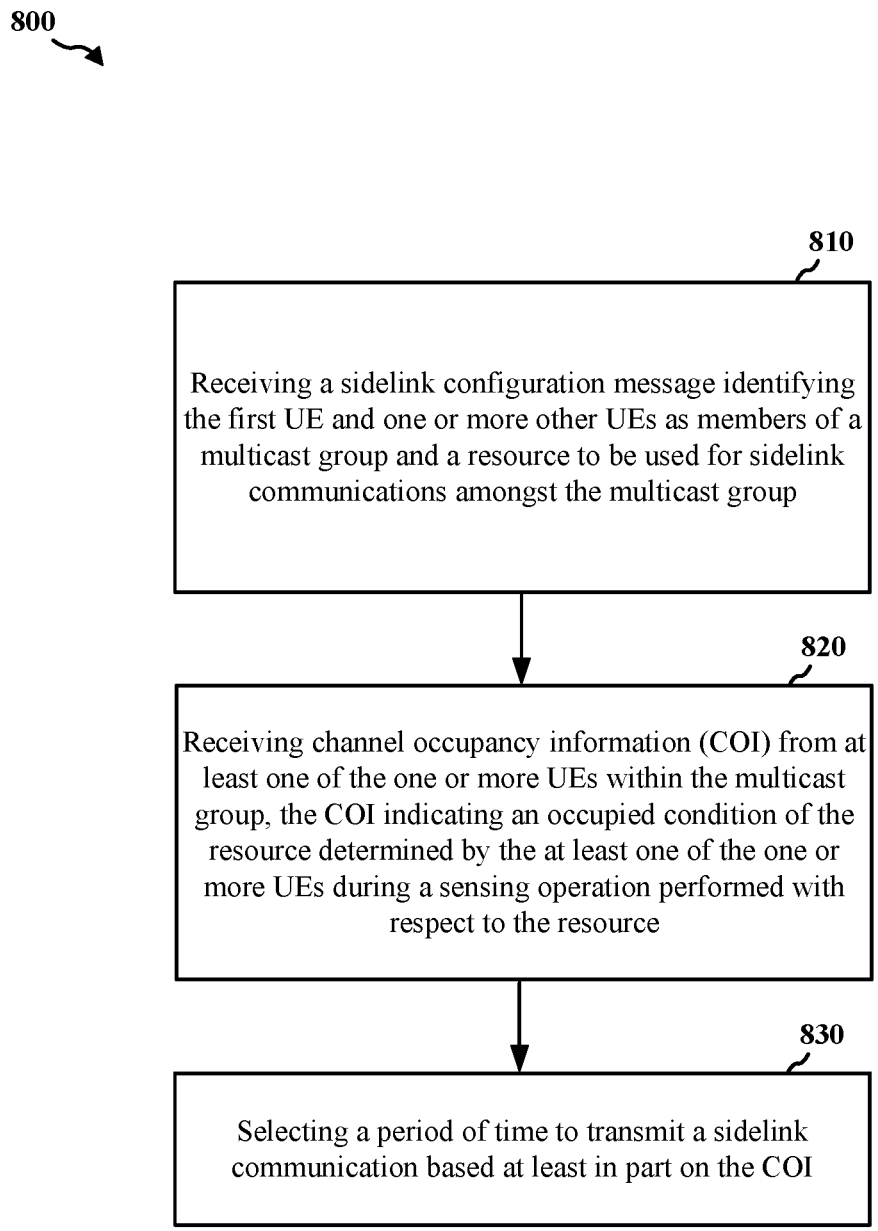
FIG. 8 is a flowchart of a method for resource selection using COI multi-access reporting, in accordance with some aspects of the present disclosure.

FIG. 8 is a flowchart of a method 800 for resource selection using COI multi-access reporting, in accordance with some aspects of the present disclosure. The method may be performed by a UE (e.g., the UE 104 of FIG. 1, which may include the memory 460 and which may be the entire UE 104 or a component of the UE 104, such as the sidelink communication component 140, the TX processor 468, the RX processor 456, and/or the controller/processor 459; the UE 450 of FIG. 4; the UE 504 of FIG. 5; and/or the UE 702 of FIG. 7).

At block 810, the method 800 includes receiving a sidelink configuration message identifying the first UE and one or more other UEs as members of a multicast group and a resource to be used for sidelink communications amongst the multicast group. For example, the sidelink communication component 140(1) may receive the configuration information 512 identifying the multicast group 506 and a resource to be used for sidelink communications in the multicast group 506. In some aspects, the UE 504(1) may receive the configuration information 512 from at least one of the plurality of base stations 502(1)-(N).

Accordingly, the UE 104, the UE 450, the UE 504, UE 702, the TX processor 368, the RX processor 356, and/or the controller/processor 359, executing the sidelink communication component 140 may provide means for receiving a sidelink configuration message identifying the first UE and one or more other UEs as members of a multicast group and a resource to be used for sidelink communications amongst the multicast group.

At block 820, the method 800 may include receiving COI from at least one of the one or more UEs within the multicast group, the COI indicating an occupied condition of the resource determined by the at least one of the one or more UEs during a sensing operation performed with respect to the resource. For example, the sidelink communication component 140(1) may receive the COI 514(1)-(N) from the members of the multicast group 506 that have identified time-frequency locations where the resource appears occupied. In some aspects, the other UEs 504(2)-(N) may send the COI 514(1)-(N) in response to the COI request 518 from the UE 504(1). In some other aspects, the UEs 504(1) may periodically send the COI 514(1)-(N)

Accordingly, the UE 104, the UE 450, the UE 504, UE 702, the TX processor 368, the RX processor 356, and/or the controller/processor 359 executing the selection component 143 may provide means for receiving a sidelink configuration message identifying the first UE and one or more other UEs as members of a multicast group and a resource to be used for sidelink communications amongst the multicast group.

At block 830, the method 800 may include selecting a period of time to transmit a sidelink communication based at least in part on the COI. For example, the selection component 143(1) may select a time-frequency location for transmitting the sidelink transmission 516(1) based on the COI 514(1)-(N). In some aspects, the selection component 143(1) may determine the availability of the resource based upon the COI 514(1)-(N). For instance, as described in FIG. 6, if the COI 514(1)-(N) indicates that the first and fourth subframe of a resource is occupied, the selection component 143(1) will not consider the first and fourth subframe of the resource as a candidate during resource selection. Instead, the selection component may select the Accordingly, the UE 104, the UE 450, the UE 504, UE 702, the TX processor 468, the RX processor 456, and/or the controller/processor 459 executing the selection component 143 may provide means for selecting a period of time to transmit a sidelink communication based at least in part on the COI.

In an aspect, method 800 may further include transmitting a request for the COI to the multicast group, the request identifying the resource or the sidelink configuration message.

In an aspect, method 800 may further include transmitting the sidelink communication during at least a portion of the period of time based on the selecting.

In an aspect, wherein the COI is a first COI, the sidelink communication is a first sidelink communication, method 800 may further include transmitting a request for a second COI to the multicast group, wherein the second COI is associated with a second resource to be used for sidelink communications amongst the multicast group, determining that the second COI has not been received within a duration of time, and transmitting a second sidelink communication using the second resource.

In an aspect, receiving the sidelink configuration message comprises receiving sidelink control information (SCI) identifying the multicast group and the resource.

In an aspect, receiving the sidelink configuration message comprises receiving a Radio Resource Control (RRC) message identifying the multicast group and the resource.

In an aspect, receiving the COI comprises receiving the COI via a physical layer (PHY) protocol over a PHY channel.

In an aspect, the resource includes a plurality of sub-channels, and receiving the COI comprises receiving a channel busy ratio (CBR) of the plurality of sub-channels.

In an aspect, the resource includes a sub-channel, and receiving the COI comprises receiving a received signal strength indicator (RSSI) indicator indicating that a RSSI value of the sub-channel is greater than an RSSI threshold.

In an aspect, the resource includes a sub-channel, and receiving the COI comprises receiving a reference signal received power (RSRP) indicator indicating that a RSSI value of the sub-channel is greater than an RSRP threshold.

In an aspect, receiving the COI comprises receiving an impairment indicator indicating that the at least one of the one or more UEs was performing a transmission during the sensing operation.

In an aspect, selecting the period of time to transmit a sidelink communication based at least in part on the COI comprises identifying a vacant slot associated with the resource based on the COI.

In an aspect, the first UE and the at least one of the one or more UEs are 5G NR wireless equipment devices.

Figure 9:
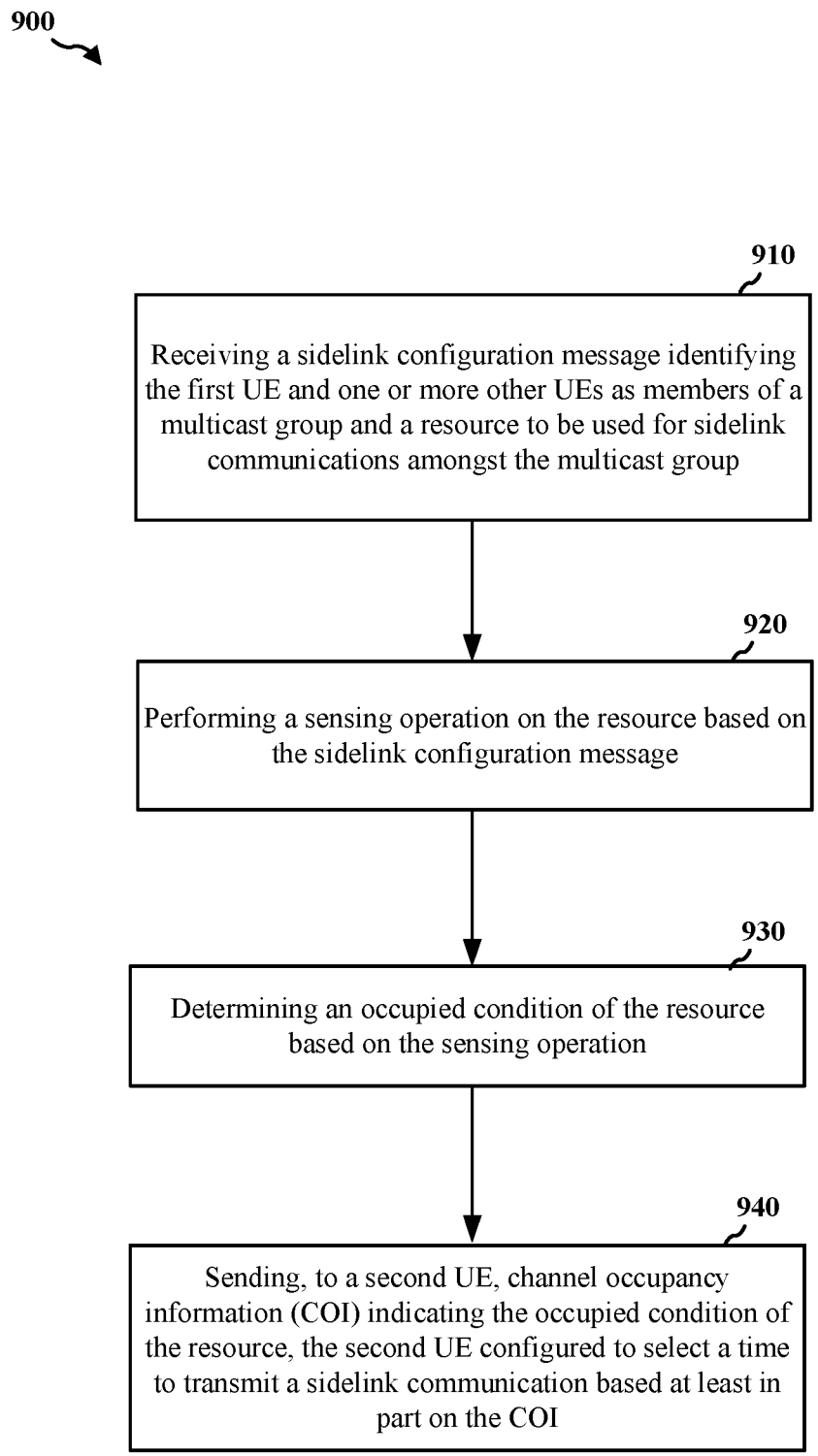
FIG. 9 is a flowchart of a method for facilitating resource selection via COI multi-access reporting, in accordance with some aspects of the present disclosure.

FIG. 9 is a flowchart of a method 900 of facilitating resource selection via COI multi-access reporting, in accordance with some aspects of the present disclosure. The method may be performed by a UE (e.g., the UE 104 of FIG. 1, which may include the memory 460 and which may be the entire UE 104 or a component of the UE 104, such as the sidelink communication component 140, the TX processor 468, the RX processor 456, and/or the controller/processor 459; the UE 450 of FIG. 4; the UE 504 of FIG. 5; and/or the UE 702 of FIG. 7).

At block 910, the method 900 may include receiving a sidelink configuration message identifying the first UE and one or more other UEs as members of a multicast group and a resource to be used for sidelink communications amongst the multicast group. For example, the sidelink communication component 140(2) may receive the configuration information 512 identifying the multicast group 506 and a resource to be used for sidelink communications in the multicast group 506. In some aspects, the sidelink communication component 140(2) may receive the configuration information 512 from at least one of the plurality of base stations 502(1)-(N).

Accordingly, the UE 104, the UE 450, the UE 504, UE 702, the TX processor 468, the RX processor 456, and/or the controller/processor 459 executing the sidelink communication component 140(2) may provide means for receiving a sidelink configuration message identifying the first UE and one or more other UEs as members of a multicast group and a resource to be used for sidelink communications amongst the multicast group.

At block 920, the method 900 may include performing a sensing operation on the resource based on the sidelink configuration message. For example, the sensing component 141(1) may perform a sensing operation on the resource identified within the configuration information 512. In some aspects, the sensing operation may determine sensed information (e.g., a sensed power) at the reception component 508(2) of the UE 504(2) at different slots or subframes of the resource.

Accordingly, the UE 104, the UE 450, the UE 504, UE 702, the TX processor 468, the RX processor 456, and/or the controller/processor 459 executing the sensing component 141(2) may provide means for performing a sensing operation on the resource based on the sidelink configuration message.

At block 930, the method 900 may include determining an occupied condition of the resource based on the sensing operation. For example, the reporting component 142(2) may compare the sensed information to a threshold value to determine an occupied condition of the resource. In some aspects, the reporting component 142(2) may compare a sensed power at the reception component 508(2) at different subframes or slots corresponding to the resource. If the sensed power at a subframe or slot is above the threshold value, the reporting component 142(2) will consider the resource occupied at that subframe or slot.

Accordingly, the UE 104, the UE 450, the UE 504, UE 702, the TX processor 468, the RX processor 456, and/or the controller/processor 459 executing the reporting component 142 may provide means for determining an occupied condition of the resource based on the sensing operation.

At block 940, the method 900 may include sending, to a second UE, COI indicating the occupied condition of the resource, the second UE configured to select a period of time to transmit a sidelink communication based at least in part on the COI. For example, the reporting component 142 may send the COI 514(2). Further, the COI 514(2) may indicate that the resource was occupied on a third subframe of the resource. Additionally, or alternatively, the COI 514(2) may include the sensed information, and the UE 504(1) may compare the sensed information to a locally-managed threshold when determining the availability of the resource. Alternatively, if the sensed power at a subframe or slot is above the threshold value, the reporting component 142(2) will consider the resource vacant at that subframe or slot, and the reporting component will not send COI 514(2) to the UE 504(1).

Accordingly, the UE 104, the UE 450, the UE 504, UE 702, the TX processor 468, the RX processor 456, and/or the controller/processor 459 executing the reporting component 142 may provide means for sending, to a second UE, COI indicating the occupied condition of the resource, the second UE configured to select a period of time to transmit a sidelink communication based at least in part on the COI.

In an aspect, the method 900 may further include receiving a request for the COI from the second UE, the request identifying the resource or the sidelink configuration message.

In an aspect, receiving the sidelink configuration message comprises receiving sidelink control information (SCI) identifying the multicast group and the resource.

In an aspect, receiving the sidelink configuration message comprises receiving a Radio Resource Control (RRC) message identifying the multicast group and the resource.

In an aspect, sending the COI comprises sending the COI via a physical layer (PHY) protocol over a PHY channel.

In an aspect, sending the COI comprises sending the COI periodically based on a parameter defined in the sidelink configuration message.

In an aspect, the resource includes a plurality of sub-channels, and determining the occupied condition of the resource comprises determining a channel busy ratio (CBR) of the plurality of sub-channels.

In an aspect, the resource includes a sub-channel, and determining the occupied condition of the resource based on the sensing operation comprises measuring a received signal strength indicator (RSSI) value of the sub-channel, and determining the occupied condition based on the RSSI value being greater than a threshold.

In an aspect, the resource includes a sub-channel, and determining the occupied condition of the resource based on the sensing operation comprises: measuring a reference signal received power (RSRP) value of the sub-channel, and determining the occupied condition based on the RSRP value being greater than a threshold.

In an aspect, determining the occupied condition of the resource based on the sensing operation comprises determining that the first UE performed a transmission during sensing operation.

In an aspect, the sensing operation is a first sensing operation, the COI is a first COI, and the method 900 further includes: performing a second sensing operation on the resource based on the sidelink configuration message, determining a vacancy condition of the resource based on the second sensing operation, and determining, based on the vacancy condition, that a second COI will not be transmitted to the second UE.

In an aspect, the first UE and the second UE are 5G NR wireless equipment devices.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In an aspect, the described techniques may include a physical layer (PHY) based reporting due to shorter duration (e.g., "instantaneous" information). The PHY reporting can provide information of an imminent resource window (part of a low number of subframes (SFs)/slots in a window) that provides updated information upon which scheduling can react.

Further, the techniques may include a single accumulated message per receiving UE to reduce the amount of messages. For example, in a network where each UE has on average N−1 neighbors in its coverage, a single message will consume the air media, accumulating N−1 neighbor UEs "feedbacks" and N accumulated messages are transmitted in a coverage of a groupcast (by each UE).

For instance, the accumulated message may be transmitted on a physical channel, and allows for aligning groupcast feedback in new introduced field (e.g., COI report trigger for scheduling feedback PSFCH). It should be noted that these techniques may further include other methods, such as Application-layer based requests for COI (with time alignment such as CQI), e.g., a request to confirm all COIs are received after initially receiving one or more COIs. In an aspect, the number of reports are managed by the Distance-based Feedback Transmission method for groupcast option 1.

In an aspect, for example, the PSFCH current design has capacity of up to about 100 bits (e.g., about 100 PRBs containing 1 bit of NACK). In one example, each UE reporting back with a channel information feedback for M subchannels, will send '1' in the respective resource to indicate that the Sub-channel if "occupied," and will not send anything if "vacant." Consequently, reporting for 10 Sub-channels can provide 10 TTIs (SFs/slots) worth of occupancy (occupied/vacant) projection. Further, reporting for 10 Sub-channels can provide additional information (e.g. distinguishing between RSSI and RSRP occupancy and blindness due to TX, or indicating granularity steps of passing threshold—more/less than 10 dBs).

In other words, each UE reports an indication of imminent (N TTIs) channel occupancy information. The COI includes an Occupied/Busy condition (e.g., indicated by a '1' reported in the resource), where being occupied is based on an RSSI>threshold or and RSRP>threshold, where in TX ("blind" condition), RSSI is considered>threshold. Also, a vacant condition (no report in resource) may be considered when RSSI<threshold and/or RSRP<threshold.

A receiving UE will receive and accumulate the occupancy information from all of the other UEs, and generate Accumulated (all UEs) Occupied/Busy information.

Then, the receiving UE shall determine the scheduling algorithm, which may include identifying resources "vacant" (no exclusion) when no indication of occupancy is received, and identifying resources as "Busy" in case of an occupancy indication. In some aspects, the receiving UE may also update RSSI/RSRP values in a case where evaluation of passing thresholds is utilized.

SOME FURTHER EXAMPLE CLAUSES

Implementation examples are described in the following numbered clauses:

1. A method of wireless communication at a first user equipment (UE), comprising:
   receiving a sidelink configuration message identifying the first UE and one or more other UEs as members of a multicast group and a resource to be used for sidelink communications amongst the multicast group;
   receiving channel occupancy information (COI) from at least one of the one or more UEs within the multicast group, the COI indicating an occupied condition of the resource determined by the at least one of the one or more UEs during a sensing operation performed with respect to the resource; and
   selecting a period of time to transmit a sidelink communication based at least in part on the COI.
2. The method of clause 1, further comprising transmitting a request for the COI to the multicast group, the request identifying the resource or the sidelink configuration message.
3. The method of any of clauses 1 or 2, further comprising transmitting the sidelink communication during at least a portion of the period of time based on the selecting.
4. The method of any of clauses 1-3, wherein the COI is a first COI, the sidelink communication is a first sidelink communication, and further comprising:
   transmitting a request for a second COI to the multicast group, wherein the second COI is associated with a second resource to be used for sidelink communications amongst the multicast group;
   determining that the second COI has not been received within a duration of time; and
   transmitting a second sidelink communication using the second resource.
5. The method of any of clauses 1-5, wherein receiving the sidelink configuration message comprises receiving sidelink control information (SCI) identifying the multicast group and the resource.
6. The method of any of clauses 1-6, wherein receiving the sidelink configuration message comprises receiving a Radio Resource Control (RRC) message identifying the multicast group and the resource.
7. The method of any of clauses 1-7, wherein receiving the COI comprises receiving the COI via a physical layer (PHY) protocol over a PHY channel.
8. The method of any of clauses 1-7, wherein the resource includes a plurality of sub-channels, and receiving the COI comprises receiving a channel busy ratio (CBR) of the plurality of sub-channels.
9. The method of any of clause 1-7, wherein the resource includes a sub-channel, and receiving the COI comprises receiving a received signal strength indicator (RSSI) indicator indicating that a RSSI value of the sub-channel is greater than an RSSI threshold.
10. The method of any of clauses 1-7, wherein the resource includes a sub-channel, and receiving the COI comprises receiving a reference signal received power (RSRP) indicator indicating that a RSSI value of the sub-channel is greater than an RSRP threshold.
11. The method of any of clauses 1-10, wherein receiving the COI comprises receiving an impairment indicator indicating that the at least one of the one or more UEs was performing a transmission during the sensing operation.
12. The method of any of clauses 1-11, wherein selecting the period of time to transmit a sidelink communication based at least in part on the COI comprises identifying a vacant slot associated with the resource based on the COI.
13. The method of any of clauses 1-2, wherein the first UE and the at least one of the one or more UEs are 5G NR wireless equipment devices.
14. A user equipment for wireless communication, comprising:
    a memory storing computer-executable instructions; and
    at least one processor coupled with the memory and configured to execute the computer-executable instructions to perform the method of any of clauses 1-13.
15. A user equipment for wireless communication, comprising means for performing the method of any of clauses 1-13.
16. A non-transitory computer-readable medium storing computer executable code, the code when executed by a processor causes the processor to perform the method of any of clauses 1-13.
17. A method of wireless communication at a first user equipment (UE), comprising:
    receiving a sidelink configuration message identifying the first UE and one or more other UEs as members of a multicast group and a resource to be used for sidelink communications amongst the multicast group;
    performing a sensing operation on the resource based on the sidelink configuration message;
    determining an occupied condition of the resource based on the sensing operation; and
    sending, to a second UE, channel occupancy information (COI) indicating the occupied condition of the resource, the second UE configured to select a period of time to transmit a sidelink communication based at least in part on the COI.
18. The method of clause 17, further comprising receiving a request for the COI from the second UE, the request identifying the resource or the sidelink configuration message.
19. The method of any of clauses 16 or 17, wherein receiving the sidelink configuration message comprises receiving sidelink control information (SCI) identifying the multicast group and the resource.
20. The method of any of clauses 17-19, wherein receiving the sidelink configuration message comprises receiving a Radio Resource Control (RRC) message identifying the multicast group and the resource.
21. The method of any of clauses 17-20, wherein sending the COI comprises sending the COI via a physical layer (PHY) protocol over a PHY channel.
22. The method of any of clauses 17-21, wherein sending the COI comprises sending the COI periodically based on a parameter defined in the sidelink configuration message.

23. The method of any of clauses 17-22, wherein the resource includes a plurality of sub-channels, and determining the occupied condition of the resource comprises determining a channel busy ratio (CBR) of the plurality of sub-channels.

24. The method of any of clauses 17-22, wherein the resource includes a sub-channel, and determining the occupied condition of the resource based on the sensing operation comprises:
measuring a received signal strength indicator (RSSI) value of the sub-channel; and
determining the occupied condition based on the RSSI value being greater than a threshold.

25. The method of any of clauses 17-22, wherein the resource includes a sub-channel, and determining the occupied condition of the resource based on the sensing operation comprises:
measuring a reference signal received power (RSRP) value of the sub-channel; and
determining the occupied condition based on the RSRP value being greater than a threshold.

26. The method of any of clauses 17-25, wherein determining the occupied condition of the resource based on the sensing operation comprises determining that the first UE performed a transmission during sensing operation.

27. The method of any of clauses 17-26, wherein the sensing operation is a first sensing operation, the COI is a first COI, and further comprising:
performing a second sensing operation on the resource based on the sidelink configuration message;
determining a vacancy condition of the resource based on the second sensing operation; and
determining, based on the vacancy condition, that a second COI will not be transmitted to the second UE.

28. The method of any of clauses 17-27, wherein the first UE and the second UE are 5G NR wireless equipment devices.

29. A user equipment for wireless communication, comprising:
a memory storing computer-executable instructions; and
at least one processor coupled with the memory and configured to execute the computer-executable instructions to perform the method of any of clauses 17-28.

30. A user equipment for wireless communication, comprising means for performing the method of any of clauses 17-28.

31. A non-transitory computer-readable medium storing computer executable code, the code when executed by a processor causes the processor to perform the method of any of clauses 17-28.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A first user equipment (UE) for wireless communication, comprising:
a memory storing computer-executable instructions; and
at least one processor coupled with the memory and configured to execute the computer-executable instructions to:
receive a sidelink configuration message identifying the first UE and one or more other UEs as members of a multicast group and a resource to be used for sidelink communications amongst the multicast group;
receive channel occupancy information (COI) from at least one of the one or more other UEs within the multicast group, the COI indicating that the resource is occupied by another UE, as determined by the at least one of the one or more other UEs during a sensing operation performed with respect to the resource; and
select a period of time to transmit a sidelink communication based at least in part on the COI.

2. The first UE of claim 1, wherein the at least one processor is further configured to execute the computer-executable instructions to:
transmit a request for the COI to the multicast group, the request identifying the resource or the sidelink configuration message.

3. The first UE of claim 1, wherein the at least one processor is further configured to execute the computer-executable instructions to:
transmit the sidelink communication during at least a portion of the period of time based on the selecting.

4. The first UE of claim 1, wherein the COI is a first COI, the sidelink communication is a first sidelink communication, and the at least one processor is further configured to execute the computer-executable instructions to:
transmit a request for a second COI to the multicast group, wherein the second COI is associated with a second resource to be used for sidelink communications amongst the multicast group;
determine that the second COI has not been received within a duration of time; and
transmit a second sidelink communication using the second resource.

5. The first UE of claim 1, wherein to receive the sidelink configuration message, the at least one processor is further configured to execute the computer-executable instructions to:

receive sidelink control information (SCI) identifying the multicast group and the resource.

6. The first UE of claim 1, wherein to receive the sidelink configuration message, the at least one processor is further configured to execute the computer-executable instructions to:
receive a Radio Resource Control (RRC) message identifying the multicast group and the resource.

7. The first UE of claim 1, wherein to receive the COI, the at least one processor is further configured to execute the computer-executable instructions to:
receive the COI via a physical layer (PHY) protocol over a PHY channel.

8. The first UE of claim 1, wherein the resource includes a plurality of sub-channels, and to receive the COI, the at least one processor is further configured to execute the computer-executable instructions to:
receive a channel busy ratio (CBR) of the plurality of sub-channels.

9. The first UE of claim 1, wherein the resource includes a sub-channel, and to receive the COI, the at least one processor is further configured to execute the computer-executable instructions to:
receive a received signal strength indicator (RSSI) indicator indicating that a RSSI value of the sub-channel is greater than an RSSI threshold.

10. The first UE of claim 1, wherein the resource includes a sub-channel, and to receive the COI, the at least one processor is further configured to execute the computer-executable instructions to:
receive a reference signal received power (RSRP) indicator indicating that a RSSI value of the sub-channel is greater than an RSRP threshold.

11. The first UE of claim 1, wherein to receive the COI, the at least one processor is further configured to execute the computer-executable instructions to:
receive an impairment indicator indicating that the at least one of the one or more UEs was performing a transmission during the sensing operation.

12. The first UE of claim 1, wherein to selecting the period of time to transmit a sidelink communication based at least in part on the COI, the at least one processor is further configured to execute the computer-executable instructions to:
identify a vacant slot associated with the resource based on the COI.

13. A method of wireless communications by a first user equipment (UE), comprising:
receiving a sidelink configuration message identifying the first UE and one or more other UEs as members of a multicast group and a resource to be used for sidelink communications amongst the multicast group;
receiving channel occupancy information (COI) from at least one of the one or more other UEs within the multicast group, the COI indicating that the resource is occupied by another UE, as determined by the at least one of the one or more other UEs during a sensing operation performed with respect to the resource; and
selecting a period of time to transmit a sidelink communication based at least in part on the COI.

14. The method of claim 13, further comprising:
transmitting a request for the COI to the multicast group, the request identifying the resource or the sidelink configuration message.

15. The method of claim 13, further comprising:
transmitting the sidelink communication during at least a portion of the period of time based on the selecting.

16. The method of claim 13, wherein the COI is a first COI, the sidelink communication is a first sidelink communication, and further comprising:
transmitting a request for a second COI to the multicast group, wherein the second COI is associated with a second resource to be used for sidelink communications amongst the multicast group;
determining that the second COI has not been received within a duration of time; and
transmit a second sidelink communication using the second resource.

17. A method of wireless communication at a first user equipment (UE), comprising:
receiving a sidelink configuration message identifying the first UE and one or more other UEs as members of a multicast group and a resource to be used for sidelink communications amongst the multicast group;
performing a sensing operation on the resource based on the sidelink configuration message;
determining the resource is occupied by another UE based on the sensing operation; and
sending, to a second UE, channel occupancy information (COI) indicating that the resource is occupied by another UE, the second UE configured to select a time to transmit a sidelink communication based at least in part on the COI.

18. The method of claim 17, further comprising receiving a request for the COI from the second UE, the request identifying the resource or the sidelink configuration message.

19. The method of claim 17, wherein receiving the sidelink configuration message comprises receiving sidelink control information (SCI) identifying the multicast group and the resource.

20. The method of claim 17, wherein receiving the sidelink configuration message comprises receiving a Radio Resource Control (RRC) message identifying the multicast group and the resource.

21. The method of claim 17, wherein sending the COI comprises sending the COI via a physical layer (PHY) protocol over a PHY channel.

22. The method of claim 17, wherein sending the COI comprises sending the COI periodically based on a parameter defined in the sidelink configuration message.

23. The method of claim 17, wherein the resource includes a plurality of sub-channels, and determining that the resource is occupied by another UE comprises determining a channel busy ratio (CBR) of the plurality of sub-channels.

24. The method of claim 17, wherein the resource includes a sub-channel, and determining that the resource is occupied by another UE based on the sensing operation comprises:
measuring a received signal strength indicator (RSSI) value of the sub-channel; and
determining that the resource is occupied by another UE based on the RSSI value being greater than a threshold.

25. The method of claim 17, wherein the resource includes a sub-channel, and determining that the resource is occupied by another UE based on the sensing operation comprises:
measuring a reference signal received power (RSRP) value of the sub-channel; and
determining that the resource is occupied by another UE based on the RSRP value being greater than a threshold.

26. The method of claim 17, wherein determining that the resource is occupied by another UE is based on the sensing operation comprises determining that the first UE performed a transmission during sensing operation.

27. The method of claim 17, wherein the sensing operation is a first sensing operation, the COI is a first COI, and further comprising:
 performing a second sensing operation on the resource based on the sidelink configuration message;
 determining a vacancy condition of the resource based on the second sensing operation; and
 determining, based on the vacancy condition, that a second COI will not be transmitted to the second UE.

28. A first apparatus for wireless communication, comprising:
 a memory storing computer-executable instructions; and
 at least one processor coupled with the memory and configured to execute the computer-executable instructions to:
 receive a sidelink configuration message identifying the first apparatus and one or more other apparatuses as members of a multicast group and a resource to be used for sidelink communications amongst the multicast group;
 perform a sensing operation on the resource based on the sidelink configuration message;
 determine that the resource is occupied by another apparatus based on the sensing operation; and
 send, to a second apparatus, channel occupancy information (COI) indicating that the resource is occupied by another apparatus, the second apparatus configured to select a time to transmit a sidelink communication based at least in part on the COI.

29. The first apparatus of claim 28, wherein the at least one processor is further configured to execute the computer-executable instructions to:
 receive a request for the COI from the second apparatus, the request identifying the resource or the sidelink configuration message.

30. The first apparatus of claim 28, wherein the sensing operation is a first sensing operation, the COI is a first COI, the at least one processor is further configured to execute the computer-executable instructions to:
 perform a second sensing operation on the resource based on the sidelink configuration message;
 determine a vacancy condition of the resource based on the second sensing operation; and
 determine, based on the vacancy condition, that a second COI will not be transmitted to the second apparatus.

* * * * *